(12) United States Patent
Clark et al.

(10) Patent No.: US 10,275,421 B1
(45) Date of Patent: Apr. 30, 2019

(54) TRANSMITTING A STATE OF A MOBILE APPLICATION TO AN ADDITIONAL MOBILE APPLICATION EXECUTING ON A CLIENT DEVICE

(71) Applicant: Facebook, Inc., Menlo Park, CA (US)

(72) Inventors: Jason Duane Clark, Woodinville, WA (US); Vijay Shankar, Sunnyvale, CA (US); Ilya Sukhar, San Francisco, CA (US); Ming Fei Li, San Francisco, CA (US); John Stephen Ketchpaw, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 860 days.

(21) Appl. No.: 14/587,489

(22) Filed: Dec. 31, 2014

Related U.S. Application Data

(60) Provisional application No. 61/986,530, filed on Apr. 30, 2014.

(51) Int. Cl.
| | | |
|---|---|---|
| *G06F 16/955* | (2019.01) | |
| *G06F 3/0484* | (2013.01) | |
| *G06Q 30/02* | (2012.01) | |
| *G06F 16/958* | (2019.01) | |
| *G06F 16/957* | (2019.01) | |

(52) U.S. Cl.
CPC ...... *G06F 16/9558* (2019.01); *G06F 3/04842* (2013.01); *G06F 16/9577* (2019.01); *G06F 16/972* (2019.01); *G06Q 30/0267* (2013.01)

(58) Field of Classification Search
CPC ............... G06F 16/972; G06F 16/9558; G06F 16/9577; G06F 3/04842; G06Q 30/0267
See application file for complete search history.

(56) References Cited

U.S. PATENT DOCUMENTS

| | | |
|---|---|---|
| 7,610,222 B2 | 10/2009 | Neofytides et al. |
| 8,126,963 B1 | 2/2012 | Rimmer |
| 8,606,872 B1 | 12/2013 | Reitnour et al. |

(Continued)

OTHER PUBLICATIONS applinks.org, "Cross-platform, open source, and simple mobile deep-linking," Date unknown, three pages. [Online] [Retrieved Jul. 29, 2015] Retrieved from the Internet <URL: http://applinks.org/documentation/>.

(Continued)

*Primary Examiner* — Luis A Brown
*Assistant Examiner* — Robert C Johnson
(74) *Attorney, Agent, or Firm* — Fenwick & West LLP

(57) ABSTRACT

An application on a client device presents a content item to a user with a deep link that includes an application identifier that identifies an additional application on the client device and contains instructions that, when executed by the additional application, present a state of that additional application. When a user selects the deep link in the content item, the client device determines whether the additional application associated with the application identifier is installed on the client device and, if so, launches the additional application and communicates the instructions and a second deep link to the additional application. The second deep link includes an application identifier associated with the application and instructions describing a state of the application when the content item was presented.

18 Claims, 7 Drawing Sheets

(56) References Cited

U.S. PATENT DOCUMENTS

| | | |
|---|---|---|
| 8,812,591 B2 | 8/2014 | Schoen et al. |
| 8,862,790 B2 | 10/2014 | Lu et al. |
| 9,356,904 B1 | 5/2016 | Ho |
| 9,628,992 B2 | 4/2017 | Dimatteo, III et al. |
| 9,633,378 B1 | 4/2017 | Nath et al. |
| 9,652,508 B1 | 5/2017 | Imaizumi et al. |
| 9,665,895 B2 | 5/2017 | Alston |
| 2005/0228723 A1 | 10/2005 | Malik |
| 2008/0046327 A1 | 2/2008 | Schnietz |
| 2008/0242284 A1 | 10/2008 | Vechey et al. |
| 2009/0054141 A1 | 2/2009 | Williams et al. |
| 2009/0054154 A1 | 2/2009 | Yang et al. |
| 2009/0287571 A1 | 11/2009 | Fujioka |
| 2010/0229081 A1* | 9/2010 | Rothbucher ........ G06F 17/3089 715/205 |
| 2010/0281364 A1 | 11/2010 | Sidman |
| 2011/0078018 A1 | 3/2011 | Chunilal |
| 2011/0083167 A1 | 4/2011 | Carpenter et al. |
| 2011/0246298 A1 | 10/2011 | Williams et al. |
| 2011/0258049 A1 | 10/2011 | Ramer et al. |
| 2012/0116830 A1 | 5/2012 | Loring et al. |
| 2012/0136934 A1 | 5/2012 | Patil et al. |
| 2012/0144281 A1 | 6/2012 | Schechter et al. |
| 2012/0265604 A1 | 10/2012 | Corner et al. |
| 2012/0323998 A1 | 12/2012 | Schoen et al. |
| 2013/0031277 A1 | 1/2013 | Lu et al. |
| 2013/0111328 A1 | 5/2013 | Khanna et al. |
| 2013/0132278 A1 | 5/2013 | Weiss |
| 2013/0218836 A1 | 8/2013 | Sullivan et al. |
| 2013/0226804 A1 | 8/2013 | Weiss |
| 2013/0298043 A1 | 11/2013 | Bailey |
| 2014/0214522 A1 | 7/2014 | Skollar et al. |
| 2014/0266594 A1 | 9/2014 | Reiser |
| 2014/0324597 A1 | 10/2014 | Schoen et al. |
| 2015/0019317 A1 | 1/2015 | Mitchell |
| 2015/0052036 A1 | 2/2015 | Vernal et al. |
| 2015/0052061 A1 | 2/2015 | Anderson et al. |
| 2015/0082239 A1 | 3/2015 | Zhao et al. |
| 2015/0154644 A1* | 6/2015 | Saxena ............. G06Q 30/0269 705/14.66 |
| 2015/0156061 A1 | 6/2015 | Saxena et al. |
| 2015/0170210 A1 | 6/2015 | Rhee et al. |
| 2015/0215383 A1 | 7/2015 | Sun et al. |
| 2015/0248651 A1 | 9/2015 | Akutagawa et al. |
| 2015/0286737 A1* | 10/2015 | Cattone ............... G06F 3/04842 715/234 |
| 2016/0232624 A1 | 8/2016 | Goldberg et al. |
| 2017/0221012 A1 | 8/2017 | Oral et al. |

OTHER PUBLICATIONS applinks.org, "Publishing App Links," Date unknown, ten pages. [Online] [Retrieved Jul. 29, 2015] Retrieved from the Internet <URL: http://applinks.org/>.

deeplink.com, "Create Deeplinks," Date unknown, one page. [Online] [Retrieved Jul. 29, 2015] Retrieved from the Internet <URL:https://deeplink.me/>.

Facebook Developers, "Analytics for App Links," Date unknown, five pages. [Online] [Retrieved Jul. 29, 2015] Retrieved from the Internet <URL:https://developers.facebook.com/docs/applinks#!/docs/applinks/analytics>.

Facebook Developers, "App Links on iOS," Date unknown, six pages. [Online] [Retrieved Jul. 29, 2015] Retrieved from the Internet <URL: https://developers.facebook.com/docs/ios/app-links/>.

Facebook Developers, "App Links," Date unknown, two pages. [Online] [Retrieved Jul. 29, 2015] Retrieved from the Internet <URL:https://developers.facebook.com/docs/applinks#!/docs/applinks>.

Perez, S., "Deeplink.me Launches a Retargeting Network for Mobile That Sends Users Back to the Apps They've Already Installed," Aug. 30, 2013, TechCrunch Daily, nine pages.[Online] [Retrieved Jul. 29, 2015] Retrieved from the Internet <URL:http://techcrunch.com/2013/08/30/deeplink-me-launches-a-retargeting-network-for-mobile-that-sends-users-back-to-the-apps-theyve-already-installed/>.

Wang, G., "Analytics Support for App Links," Aug. 21, 2014, Facebook Developers, three pages. [Online] [Retrieved Jul. 29, 2015] Retrieved from the Internet URL:https://developers.facebook.com/blog/post/2014/08/21/analytics-support-for-app-links/.

Wasserman, T., "How Deep Links Could Revolutionize Mobile Advertising," Oct. 18, 2013, Mashable, Inc., five pages. [Online] [Retrieved Jul. 28, 2015] Retrieved from the Internet <URL:http://mashable.com/2013/10/18/deep-links/>.

Wikipedia, "Mobile deep linking," Jul. 28, 2015, four pages. [Online] [Retrieved Jul. 28, 2015] Retrieved from the Internet <URL:http://en.wikipedia.org/wiki/Mobile_deep_linking>.

Abbot, D., "Deep Link your Apps to Drive Engagement," Apr. 28, 2014, five pages. [Online] [Retrieved on Feb. 8, 2018] Retrieved from the Internet <URL: https://medium.com/@deepakabbot/deep-link-your-apps-to-drive-engagement-63b67536dbb9.>

* cited by examiner

TRANSMITTING A STATE OF A MOBILE APPLICATION TO AN ADDITIONAL MOBILE APPLICATION EXECUTING ON A CLIENT DEVICE

CROSS REFERENCE TO RELATED APPLICATIONS

This application claims the benefit of U.S. Provisional Application No. 61/986,530, filed Apr. 30, 2014, which is incorporated by reference in its entirety.

BACKGROUND

This disclosure relates generally to an application linking framework, and more specifically to cross-platform mobile application-to-application linking, including allowing deep linking into particular states in applications.

While linking between web-based content is commonplace, the ability to link between native mobile applications has not been readily available for application developers. Current solutions have not provided an easy way for application-to-application linking that works across various different mobile platforms and that allows mobile "deep linking" from one application to a specific page or state within another application rather than just opening up the content in a mobile web browser. Yet, for online systems the ability to link its mobile application content to other mobile applications and to allow other mobile applications to link to it would provide a lot more flexibility to its users.

As an example of such an online system for which mobile application linking would be valuable, social networking systems allow users to connect to and communicate with other users, including through their mobile devices. Mobile social networking applications can provide content (e.g., news stories, advertisements, etc.) to users within a newsfeed or other sources in the application, and this content may have a link to content for which there is another mobile application. Currently, though, the content for the other mobile application is inconveniently provided on a mobile web browser rather than within the other mobile application itself, and the presentation of the content may not be as intended by the other mobile application. Similarly, applications developers cannot simply link their mobile applications directly to content within the mobile social networking application.

SUMMARY

An application linking framework provides cross-platform mobile application-to-application linking, including allowing deep linking into particular states in mobile or native applications ("apps"). The mobile application linking framework makes it easy for application developers to deep link between mobile applications across different mobile operating systems (e.g., iOS®, ANDROID™, etc.) and different device types (e.g., iPHONE™, iPAD™, WINDOWS™ phone etc.). In one embodiment, the mobile environment is made addressable similar to the web environment, such that mobile applications can use an address to identify and point to other mobile applications, causing those native mobile applications to open to a specific state in the application rather than sending users to a mobile web version of the application.

The application linking framework allows for content in a mobile application installed on a client device to deep link to a particular state in another application. An online system can act as a content server that serves content to an associated mobile application in a mobile environment. For example, the online system can be a social networking system with an associated mobile social networking application that can serve content, such as ads, to social networking system users. As an ad server, the social networking system or other online system can present application-to-application linked ads in the mobile environment. Such an ad is associated with an advertiser and can include a deep link identifying an additional application associated with the presented ad (e.g., a deep link in a travel ad to a specific travel deal page in a mobile travel app). The deep link includes an application identifier (also referred to as "app ID") associated with the additional application (e.g., app ID for mobile travel app) and one or more instructions for execution by the additional application to configure the additional application to a specific state (e.g., instructions to configure the mobile travel app to a state that displays the particular travel deal referenced in the ad). A state of the additional application identifies data received by the additional application as well as data presented by the additional application. Instructions included in a deep link are executed by the additional application identified by the deep link to configure the additional application into a state where content associated with the advertisement or other suitable content is presented based on the instructions. Deep links included in various advertisements or other content include different instructions, allowing different content/advertisements to differently configure states of additional applications. Additionally, a deep link may include metadata describing information associated with the user, information associated with the application, information associated with the client device, information associated with the operating system of the client device, or any other suitable metadata. In some embodiments, the information included in the deep link acts as an address, similar to a URL, which allows one mobile application to cause another mobile application to open to a particular state, thus providing addressability to the mobile environment. Ads will commonly be used as an example throughout this description, though the application-to-application linking, including deep linking, can be used to link between any content within mobile applications.

As one example that relates to advertising in the mobile environment, if an ad identifies a specific product or service, a deep link included in the ad specifies instructions that cause an additional application identified by the deep link to retrieve and present content about the specific product or service to the user. In another example, a deep link included in an ad includes instructions for populating fields maintained by an additional application with information maintained by an application that presents the ad. Instructions included in a deep link within an ad may also identify an offer described by the ad and a command to apply the offer to one or more objects maintained by an additional application identified by the deep link. In another example, an ad includes an input for performing an action, and a deep link included in the ad specifies instructions for performing the action via an additional application identified by the deep link.

When an ad including a deep link is presented via an application executing on a client device, the application receives an indication when a user interacts with the ad and determines if the additional application identified by the deep link is installed on the client device. If the additional application is not installed on the client device, an application installation interface, such as another application or a web page for purchasing, downloading, or installing the additional application, is displayed on the client device using information identifying the additional application from the deep link. In another embodiment, if the additional application is not installed on the client device, the system can default to the mobile web version of the application content.

However, if the application determines that the additional application is installed on the client device, instructions from the deep link are communicated from the application that presented the ad to the additional application identified by the deep link. By executing the instructions from the deep link received from the application, the additional application is configured into a state specified by the instructions. The state of the additional application from execution of the instructions from the deep link is then presented to the user via the client device. This simplifies user interaction with the additional application by configuring the additional application to a state based on information from the advertisement, which more easily allows the user to retrieve information relevant to the advertisement from the additional application.

In other embodiments, a deep link is associated with an input or with content presented by an application. The deep link includes an application identifier of an additional application and one or more instructions for the additional application to perform an action based on information from the application identified by the instructions. When the additional application receives the instructions specified by the deep link from the application, the additional application executes the instructions and is configured into a state specified by the instructions, which is presented to the user. For example, an application identifies an additional application and a search query through a deep link associated with an input presented by the application. When a user accesses the input, the search query is communicated from the application to the additional application, which performs a search across one or more sources based on the search query and subsequently presents the search results as the state of the additional application. Thus, deep links may also allow applications to leverage functionality of additional applications executing on a client device to provide a user with additional information.

In addition to communicating instructions of the deep link from the application that presented the ad or other content to the additional application identified by the deep link, a reverse deep link describing a state of the application when the ad was presented can be communicated to the additional application as well. Similar to the deep link, the reverse deep link includes one or more additional instructions and an additional application identifier that identifies the application from which the instructions were received as well as, optionally, content describing the state of the application when the identified ad was presented. The additional application can present the reverse deep link and/or the content included in the reverse deep link when presenting the state associated with the instructions included in the deep link. For example, a user playing a game in a game mobile app can interact with an offer in the game that deep links to a state in another mobile app that presents the offer, and the offer mobile app can provide the user with an option to return to a particular state in the game mobile app that corresponds with the game level the user was playing (e.g., click here to return to Level 7 of Game X).

When the user interacts with the reverse deep link via the client device (e.g., the link in the offer mobile app to return to Level 7 in the game mobile app), an additional indication is received by the client device, for example, by the additional application (e.g., the offer mobile app) and communicated to the application (e.g., the game mobile app) associated with the application identifier included in the reverse deep link. After receiving the additional indication, one or more additional instructions included in the reverse deep link are communicated by the client device to the application associated with the reverse deep link. Thus, the application executes the one or more additional instructions and presents a state of the application based on the one or more additional instructions (e.g., the game mobile app presents Level 7 of Game X).

In some embodiments, when an indication of a user interaction with a deep link or a reverse deep link is received by the client device, the client device sends analytic information describing the user interaction to an online system associated with the linked content. For example, if an additional application that is not associated with the online system presents a reverse deep link including additional instructions describing a state of an application associated with the online system, the application can send a payload to the additional application including a tracking request. The tracking request is a request to track information associated with the reverse deep link, such as information describing user actions on the additional application that are associated with the reverse deep link, content of the identified ad, and any combination thereof. The information of the tracking request is then communicated from the additional application to the originating application, and the client device sends analytic information describing the user interaction associated with the additional application to the online system. For example, an ad for a product in a mobile social networking app can include a deep link to another store mobile app for purchasing the product and the deep link can include a tracking request that asks the store mobile app to ping back the mobile social networking app regarding whether the user made the purchase, and thus the ad resulted in a conversion.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
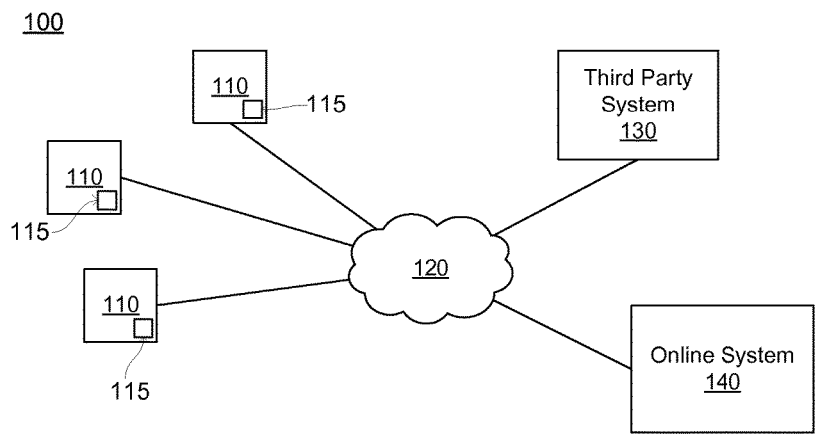
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. The embodiments described herein can be adapted to any suitable online systems such as social networking systems and messaging systems (e.g., WHATSAPP, MESSENGER, etc.).

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a mobile device having computer functionality, such as a personal digital assistant (PDA), a mobile telephone, a smartphone, tablet, or another suitable device, such as any mobile device that executes native mobile applications (native or mobile apps) developed for use on particular mobile platforms or devices. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

A client device 110 includes an application interface module 115, which communicates information between different applications executing on the client device 110. For example, the application interface module 115 receives an application identifier and one or more instructions associated with the application identifier and communicates the instructions to an application corresponding to the application identifier. In one embodiment, an application identifies an additional application and one or more instructions for communication to the additional application to the application interface module 115, which communicates the instructions to the additional application. In some embodiments, if the application interface module 115 receives an application identifier that does not correspond to an application installed on the client device 110, the application interface module 115 presents an application installation interface via the client device 110 prompting a user to install an application corresponding to the application identifier.

As one example in which the online system 140 is a social networking system, the social networking system can be a server that serves social networking content to the client devices 110. Where the client devices 110 are mobile devices, these devices can include a mobile social networking application (e.g., FACEBOOK® mobile app) or other mobile app (e.g., a messaging or content-sharing app, such as MESSENGER, WHATSAPP, SNAPCHAT, etc.). The social networking system 140 can serve content for display via the mobile social networking application. This mobile social networking application can include deep links to various other mobile applications on the client devices 110 (e.g., deep links from ads to product or service pages, from invitations to event pages, from news stories to articles relating to those news stories, from news stories about products to pages for those products, among other deep links). Similarly, the other mobile applications on the client devices can include deep links to the mobile social networking application (e.g., deep links from invitations to social networking event pages, from ads to business pages on the social networking system, among other deep links).

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
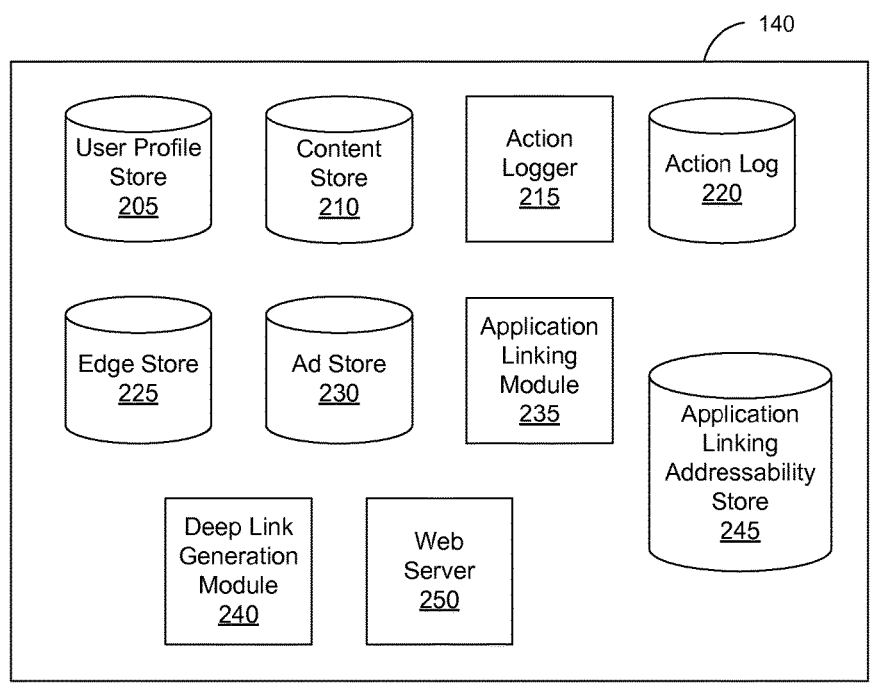
FIG. 2 is a block diagram of an online system, in accordance with an embodiment.

FIG. 2 is a block diagram of an architecture of an online system 140. In some embodiments, the online system 140 is a social networking system. FIG. 2 illustrates modules associated with online system 140 including those modules that might be found in a social networking system 140, though such social networking system modules may be absent in other embodiments of the online system 140. Since the social networking system is one example of an online system 140 that could be used, the social networking system is referred to throughout this description as an example via which the invention is illustrated. However, even where the social networking system is referred to throughout, it is understood that the system can include other online systems besides social networking systems.

The online system/social networking system 140 shown in FIG. 2 includes a user profile store 205, a content store 210, an action logger 215, an action log 220, an edge store 225, an ad store 230, application linking module 235, a deep link generation module 240, an application linking addressability store 245, and a web server 250. As stated previously, the online system 140 shown in FIG. 2 can be a social networking system, a messaging system, or any other suitable online system. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content as well as a deep link, further described herein, linking to a page or otherwise state of an application associated with the online system 140 presenting the content. Online system users may create objects stored by the content store 210, such as status updates, photos tagged by users to be associated with other objects in the online system, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140. A content item can also be an advertisement associated with an advertiser, where advertisements associated with advertisers are further described below in conjunction with the ad store 230.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or another user in the online system 140 based on the actions performed by the user. A user's affinity may be computed by the online system 140 over time to approximate a user's interest for an object, interest, or other user in the online system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement campaigns ("ad campaigns") are included in the ad store 230. An ad campaign includes one or more advertisements received from an advertiser for presentation to users of the online system 140 such as a social networking system, messaging system or any other suitable online system. Each advertisement includes an advertisement content ("ad content"), which is content presented to an online system user, such as text data, image data, audio data, video data, or any other suitable data. An advertisement may also associate a destination address with an ad content to specify a source of content presented to a user that accesses the advertisement when it is presented. For example, the destination address identifies a landing page including content that is presented to the user when the user accesses the advertisement. The destination address can be included in a deep link.

Additionally, advertisements, such as those in an ad campaign, are associated with a bid amount. The bid amount associated with an advertisement specifies an amount of compensation an advertiser provides the online system 140 for presenting the advertisement, for a user interacting with the advertisement, or for another suitable interaction with the advertisement. Based on the bid amount associated with an advertisement, the online system 140 determines an expected value to the online system 140 for presenting the advertisement to a user. For example, the expected value is an amount of monetary compensation received by the online system 140 from an advertiser for presentation of the advertisement to a user, for a user interacting with the presented advertisement, or based on any other suitable condition. In one embodiment, the expected value is determined by multiplying the bid amount by a probability of the advertisement being accessed.

Additionally, advertisements, such as those in an ad campaign, may be associated with one or more targeting criteria. An advertiser may specify targeting criteria associated with an advertisement. Targeting criteria specify one or more characteristics of users eligible to be presented with an advertisement associated with the targeting criteria. Associating different targeting criteria with different advertisements in an ad campaign allows an advertiser to tailor presentation of advertisements to users having specific characteristics, allowing advertisements with different ad content to be presented to users with different characteristics. For example targeting criteria specify demographic information, connections, or actions associated with a user. In some embodiments, targeting criteria may be associated with the ad campaign in its entirety, so multiple advertisements in the ad campaign are associated with the targeting criteria.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identify users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in targeting criteria allows advertisers to further refine which users are eligible to be presented with advertisements from an ad campaign. As another example, targeting criteria identifies users having a connection to another user or object or having a particular type of connection to another user or object.

An ad campaign can also include other information such as a budget that specifies a total amount of compensation an advertiser provides the online system 140 for presenting advertisements included in the ad campaign. The budget may be allocated for the ad campaign as a whole or per advertisement. In addition, the advertiser may specify instructions for allocating the budget among the advertisements in the ad campaign. For example, the instructions specify modification of a bid amount associated with an advertisement included in the ad campaign. The instructions may also include other suitable information describing allocation of budget among advertisements included in the ad campaign.

An ad campaign or one or more advertisements in an ad campaign, or any other content presented inside or outside of the online system, may include one or more deep links. A deep link is a link specifying an application different than an application presenting an advertisement (an "additional application") and a specific state of the additional application. The deep link for presenting content on a mobile application includes an application identifier and instructions and, in various implementations, the application identifier can also be referred to as a scheme and the instructions can be in the form of a path and one or more query strings instructing the application to present a state of the application such as a page and the order and/or format of the path and query strings can differ for various operating systems. A state of the additional application identifies data received by the additional application as well as data presented by the additional application. For example, a state of the additional application specifies user identifying information provided by the user to the additional application and specifies a format in which the user identifying information is presented by the additional application as well as additional data presented by the additional application.

Various information (e.g., the application identifier and the instructions) in a deep link can be used in a custom address scheme (e.g., a URL) that allows the mobile app-to-app linking similar to the address scheme used for linking of content on the web. However, the custom address scheme differs from an address scheme used for presenting content on the web (e.g., via a web browser) and can also differ for presenting content on various client devices. For example, an address scheme used for presenting content on the web may have a format of "protocol://domain:path?query_string" to present content at "path?query_string" on "domain" using "protocol" to access the content. The custom address scheme for presenting content via a mobile application may have a format of "application_identifier://path?query_string" for presenting content located at "path?query_string" on a mobile application associated with "application_identifier."

For various operating systems or types of client devices, the custom address scheme may differ in format as well. For example, the custom address scheme for a first client operating IOS® can be "application_identifier://launch?itm=#" for presenting a content item ("itm=#") in an application associated with "application_identifier." The custom address scheme for a second client operating ANDROID™ can be "application_identifier://item/view?id=#" for presenting a content item ("id=#") in an application associated with "application_identifier."

In various embodiments, a deep link associated with an advertisement (or with an advertising campaign) or other content includes an application identifier, one or more instructions, and metadata. Alternatively, the metadata may be associated with the advertisement/content and not included in the deep link. The application identifier is information identifying an application. For example, an application identifier is a name of the additional application or an identifier associated with the application by an application installation interface (e.g., a purchasing, installing, or downloading identifier associated with the application) executing on a client device 110, or any other suitable information for executing the application via the client device 110 or presenting information from the application via the client device 110. If the application associated with the deep link is installed on a client device 110 presenting an advertisement/content associated with the deep link, a name of the application is determined from the application identifier in the deep link to execute the application. However, if the application associated with the deep link is not installed on the client device 110, a purchasing, installing, or downloading identifier is determined from the application identifier and communicated to an application installation interface or a web browser executing on the client device 110 to prompt a user to obtain the application corresponding to the application identifier.

One or more instructions associated with the application are also included in a deep link. The one or more instructions identify a specific state of the application, so the application operates in the specific state when the one or more instructions are executed by the application. For example, the instructions identify content associated with an advertisement (e.g., a description of a product or service being advertised) for presentation by the application associated with the application identifier. However, the one or more instructions may identify any suitable information for presentation by the application associated with the application identifier. Different instructions may be associated with deep links included in different advertisements or with different advertising campaigns. Instructions included in a deep link are further described in conjunction with FIG. 3.

In some embodiments, a deep link included in an advertisement or other content also includes metadata describing additional information for communication to an application identified by the application identifier of the deep link. For example, metadata associated with the user, associated with the application, associated with the client device 110, or associated with an operating system of the client device 110 is included in the deep link. For example, metadata included in a deep link may be used by the application identified by the deep link to format presentation of information to the user. The metadata can also include user profile information of a user presented with a deep link. The user profile information can include a user identifier, an access token, and an expiration time. The access token indicates whether the application associated with the application identifier has been previously or is currently authenticated with the online system 140 associated with the application. The expiration time can be an amount of time in which the application is authenticated with the online system 140. Further, the metadata can include a web address in addition to the custom address scheme that can be used to present content associated with the deep link a web browser. Thus, if the application associated with the application identifier is not installed on the client device 110, the content of the deep link can still be presented on the web browser using the web address. The metadata can also include referrer information describing the information of an application that presented the deep link including an application identifier associated with an additional application. The metadata can also include a store identifier associated with the application for use when presenting the application for purchase, download, or install on an application installation interface.

Information (e.g., application identifier, instructions, metadata, and any combination thereof) in a deep link is also associated with specific tags based on information associated with the client device. As an example, tags associated with the application identifier for use on a client device with a first operating scheme such as iOS® would differ from tags associated with the application identifier for use on a client device with a second operating scheme such as ANDROID™ just as tags associated with the application identifier for use on a first type of client device such as an iPHONE™ would differ from tags associated with a second type of client device such as a WINDOWS™ phone. Other operating schemes with differing custom address schemes include WINDOWS™ phone, BlackberryOS (e.g., Blackberry 10), FIREFOX OS™, SAILFISH OS™, TIZEN™, UBUNTU TOUCH OS™, and WEBOS® and additional types of client devices include iPHONE™, iPAD™, ANDROID™, and WINDOWS™ phone.

As an example, for an application executing on a client device using IOS®, the tags associated with the application identifier would include "al," "ios," and "app_name" formatted as "al:ios:app_name." For an application executing on the client device using ANDROID™, the tags associated with the application identifier would include "al," "android," and "app_name" formatted as "al:android:app_name." As shown in the example, some tags (e.g., "al" and "app_name") may be the same for client devices using differing operating systems but other tags (e.g., "ios" and "android") differ for the client devices. The tags that are different can identify the type of device or operating system used by the client device such as "ios" for client devices operating iOS®, "iphone" for iPHONE™ client devices, "ipad" for iPAD™ client devices, "android" for ANDROID™ client devices or client devices using ANDROID™, "windows_phone" for WINDOWS™ phone client devices, "windows" for client devices operating WINDOWS™, and "windows_universal" for client devices operating WINDOWS™ universal.

The application linking module 235 provides instructions to third-party system 130, such as application developers, for inclusion in applications. When executed by an application, the instructions configure a state of the application based on information or commands specified by the instructions. Instructions provided by the application linking module 235 are in a format compatible with the application in which ads would be presented, with the application linking module 235, the online system 140, or any combination thereof. For example, the application linking module 235 can also provide a software development kit ("SDK") to third-party systems 130 for inclusion in applications that includes instructions for configuring application states. The provided instructions for inclusion in additional applications would work in conjunction with instructions received by an application via a deep link identifying the application to configure a state of the application based on the instructions from the deep link.

The deep link generation module 240 generates a deep link for a state of an application such as an application associated with the online system 140 or an application associated with an advertiser advertising products in the online system 140. The generated deep link can be generated for an application using a custom address scheme used by the application and includes an application identifier and one or more instructions. For example, the deep link is generated using a scheme name, a path and, one or more query strings. The scheme name is an application identifier identifying the application to which the deep link is linking and the path and one or more query strings are instructions in the deep link specifying a state or location in the application associated with the application identifier. The state of an application associated with an advertiser can be a page displaying a product of the advertiser as described below in conjunction with FIGS. 3, 4 and 7. The state of the application associated with the online system 140 can also be a page associated with an event as described below in conjunction with FIG. 6.

The application linking addressability store 245 stores application identifiers, information included in deep links, metadata associated with deep links and any other suitable information associated with deep links. Stored information can also be stored in association with permission information from a user (e.g., an advertiser) associated with the stored information. Thus, users of the online system 140 can request information stored in the application linking addressability store 245, allowing for users to easily link into application associated with the online system 140 or out of the application into an additional application, where information describing deep linking into the additional application is stored in the application linking addressability store 245.

The web server 250 links the online system 140 via the network 120 to the one or more client devices 110, as well as to the one or more third party systems 130. The web server 250 serves web pages, as well as other content, such as JAVA®, FLASH®, XML and so forth. The web server 250 may receive and route messages between the online system 140 and the client device 110, for example, instant messages, queued messages (e.g., email), text messages, short message service (SMS) messages, or messages sent using any other suitable messaging technique. A user may send a request to the web server 250 to upload information (e.g., images or videos) that are stored in the content store 210. Additionally, the web server 250 may provide application programming interface (API) functionality to send data directly to native client device operating systems, such as IOS®, ANDROID™, WEBOS® or BlackberryOS.

Figure 3:
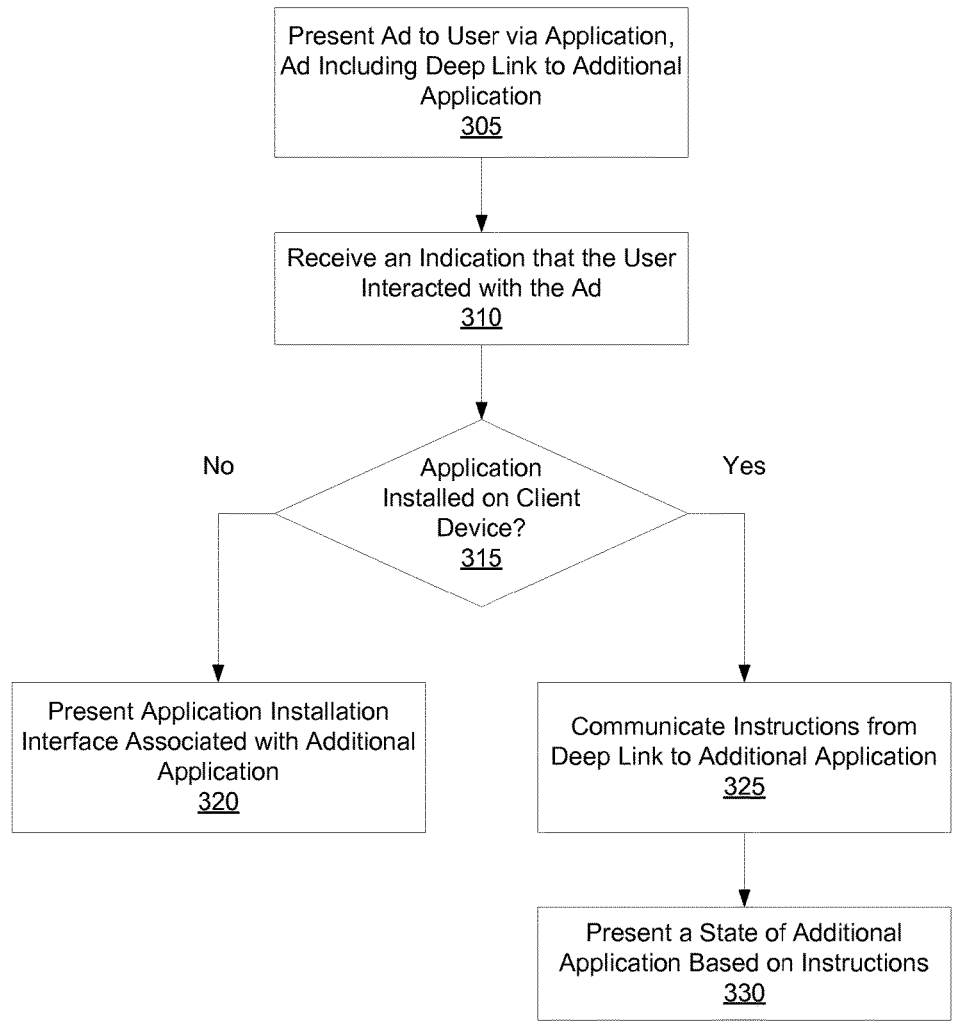
FIG. 3 is a flowchart of a method for presenting content associated with an advertisement using an additional application identified by the application to a user of an online system, in accordance with an embodiment.

Communicating Information Between Applications Via Interaction with an Advertisement FIG. 3 is a flowchart of one embodiment of a method for presenting content associated with an advertisement using an additional application identified by the application to a user of an online system 140. In various embodiments, the steps described in conjunction with FIG. 3 may be performed in different orders. Additionally, in some embodiments, the method may include different and/or additional steps than those shown in FIG. 3. The functionality described in conjunction with FIG. 3 may be provided by an application interface module 115 of a client device 110, in one embodiment, or may be provided by any other suitable component, or components, in other embodiments.

The online system 140 maintains information describing various advertisements and identifies a content item such as an ad for presentation to a user of the online system 140. The identified advertisement is communicated from the online system 140 to a client device 110 for presentation 305 to the user. For example, an application executing on the client device 110, such as an application associated with the online system 140, presents 305 the ad to the user. The ad is associated with an advertiser and targeting criteria and includes ad content and a deep link. As described above in conjunction with FIG. 2, the deep link is information specifying an application and a specific state in the application. In various embodiments, the deep link includes an application identifier and one or more instructions. Additionally, the deep link may include metadata. The application identifier is information identifying an additional application other than the application presenting 305 the ad, such as a name of the additional application or an identifier for the additional application used by an application installation interface or by a third-party system 130. The metadata may include information describing the client device 110, describing the user presented the ad, describing the application presenting 305 the ad, or any combination thereof. The identifier and metadata are further described above in conjunction with FIG. 2.

Instructions in a deep link cause the additional application identified by the deep link to be launched or opened to a specified state. For example, the instructions are communicated to the additional application, which is configured to the specific state by executing the instructions. The instructions included in the deep link may vary for various ads or ad content in ads. For example, if the ad is for a specific product or service, the instructions may configure the additional application to present content describing the specific product or service. If the ad includes an offer for the user, then the instructions may configure the additional application to apply the offer to a purchase or other interaction with the additional application. As another example, one or more instructions may include information identifying inputs to one or more input fields used by the additional application. In another example, if the ad associated with the deep link is associated with an action to be performed by the user, the one or more instructions communicate information to the additional application for performing the action. The instructions can be specified by the advertiser associated with the ad, generated by the online system 140 based on ad content of the ad, specified using any other suitable method, or any combination thereof. Additional examples and use cases for instructions included in a deep link are further described below.

When the user interacts with the presented application via the client device 110, the application executing on the client device 110 that presents 305 the ad receives 310 an indication of the user interaction. For example, when the user interacts with a portion of a display device of the client device 110 (e.g., contacts the portion of the display device with a finger or with a stylus) in which the ad is presented 305, the application receives 310 the indication. As another example, the indication is received 310 by the application when the client device 110 receives a gesture from the user with the display device or with another input device that contacts at least a portion of the display device where the ad is presented 305. However, the indication may be received 310 when the user performs any suitable interaction with the presented ad via the client device 110. For example, the user interacts with the ad by providing an audio command, by approaching the portion of the display device presenting the ad with a physical stylus to a threshold distance from a surface of the display device, or any other interaction or gesture indicating selection of the ad.

After receiving 310 the indication that the user interacted with the ad, the application determines 315 if the additional application identified by the deep link in the ad is installed on the client device 110. If the application determines 315 that the additional application identified by the deep link is not installed on the client device 110, an application installation interface or web page for purchasing, downloading, or installing the additional application is presented 320 via the client device 110. In some embodiments, the application identifier from the deep link is communicated to the application installation interface, so information for purchasing, downloading, or installing the additional application specified by the application identifier when the application installation interface is presented 320. Communicating the application identifier from the deep link to the application installation interface simplifies purchase or installation of the additional application via the application installation interface.

However, if the application determines 315 that the additional application is installed on the client device 110, the one or more instructions from the deep link are communicated 325 from the application presenting 305 the ad to the additional application. For example, the application compares a name of the additional application from the application identifier of the deep link to information maintained by the client device 110 identifying applications installed on the client device 110. If the information maintained by the client device 110 identifies an application name matching the name of the additional application, instructions (and metadata, if applicable) from the deep link are communicated 325 from the application to the additional application. Alternatively, the application identifier from the deep link is communicated 325 from the application to the additional application, and if the additional application communicates a confirmation to the application that the additional application is associated with the application identifier, the application communicates 325 the instructions and metadata, if included in the deep link, to the additional application.

In addition, interaction information describing the user's interaction with the ad may also be communicated 325 from the application to the additional application. For example, if the ad includes multiple options for the user to select, then the interaction information includes an option selected by the user's interaction with the ad. Examples of options included in an ad include a selection of a product or service over another product or service, a selection of an action over another action, or any other suitable selection of content presented by the ad. In some embodiments, the interaction information may be communicated 325 after communicating the instructions to the additional client device or may be communicated 325 after the application receives confirmation that the additional application is associated with the application identifier. Interaction information is further described below in conjunction with analytic information in FIG. 5.

By executing the instructions from the deep link received from the application, the additional application is configured into a state specified by the instructions. The state of the additional application from execution of the instructions from the deep link is presented 330 via the client device 110. The state of the additional application is based on data received by the application as well as data presented by the additional application. As the instructions from the deep link provide data to the additional application, executing the instructions causes the additional application to present content based on the data provided by the instructions. In one embodiment, the instructions include information describing the content of the ad, so the state of the additional application includes the information describing the content of the ad. Additionally, interaction information describing the user's interaction with the ad may also be used by the additional application to determine the state presented 330 via the client device 110.

For example, if the instructions from the deep link communicated 325 to the additional application from the application identify information associated with a product, service, or object, executing the instructions causes the additional application to present 330 a state in which the information associated with a product is presented via the additional application (e.g., the additional application presents a page associated with the product, service, or object). In another example, if the instructions specify information for populating fields, executing the instructions causes the additional application to populate the fields identified by the instructions with the specified information. As another example, the instructions identify an action and one or more parameters for performing the action, so the additional application performs the action based on the one or more parameters when it executes the instructions. If the additional application performs an action, the state of the additional application displayed 330 may include information associated with additional actions (e.g., a confirmation of the action). Additional examples of presented states of the additional application are further described below.

The presented state of the additional application may also include a link (e.g., a hyperlink) or a deep link (also referred to herein as a reverse deep link) identifying the application from which the instructions were received. Accessing this link or deep link communicates instructions to the application that, when executed by the application, cause presentation of the application in a state based on the instructions. For example, accessing a deep link associated with the application and presented by the additional application causes the client device 110 to present the application. Based on the instructions in the deep link identifying the application, the state of the application when the indication of interaction with the ad was received 310 is presented.

In some embodiments, the additional application communicates instructions to the application based on the presented state of the additional application. For example, if the presented state of the additional state makes use of information maintained by the application but not included in the instructions communicated 325 to the additional application, the additional application may communicate instructions to the application for the information maintained by the application. For example, if the user purchases a product or service by interacting with the presented state of the additional application, but payment information was not included in the instructions sent to the additional application by the application, the additional application communicates instructions to the application to prompt the user to verify payment information or obtain payment information from the user. In this example, after obtaining payment information, the application may communicate a confirmation of payment to the additional application. In another example, if the user allows transfer of payment information (e.g., encrypted payment information) between the application and the additional application, when the user purchases a product or a service via the presented state of the additional application, the additional application communicates instructions to the application requesting that the application communicate the payment information to the additional application.

In some embodiments, the additional application allows the user to communicate information from the additional application to the application by associating a deep link identifying the application with content provided by the additional application. The deep link identifying the application may include instructions identifying the content as well as instructions for presenting or maintaining the content via the application. In one embodiment, a deep link is associated with an input included in the additional application and identifies the application as well as instructions for the application to present content from the additional application. For example, an indication of a purchase made via an additional application is communicated to an application associated with the social networking system 140 via a deep link identifying the application associated with the social networking system 140 and the indication of the purchase, allowing the indication of the purchase to be presented to additional social networking system users, subject to one or more privacy settings. To present the content from the additional application, the deep link associated with an input or with content provided by the additional application includes instructions identifying the content and instructions for populating one or more fields in the application for presenting or for maintaining information associated with the additional application. As an example, an application includes an input for presenting content maintained by the application via an application associated with an online system 140, the input includes a deep link identifying the online system 140 and instructions for mapping information describing the content presented by the application to fields used by the application associated with the online system 140 for generating a story or other data for presenting the content via the online system 140; the instructions in the deep link associated with the input may also include a command to post a story describing the content maintained by the application via the online system 140 when the application associated with the online system 140 receives the instructions describing the content maintained by the application. In some embodiments, content from the additional application is not communicated to the application unless the user provides permission that the content may be communicated to the application.

As described above, deep links included in various ads may have different instructions. Additionally, deep links may be associated with inputs presented via an application to communicate instructions from the application to an additional application, so interacting with an input presented by an application configures the state of the additional application identified by a deep link associated with the input. For purposes of illustration, various examples of instructions included in deep links and example states of additional applications based on execution of the instructions are described below.

Displaying Content Associated with an Advertised Product or Service

If the ad presented 305 to the user via an application identifies a specific page (e.g., a page describing a product or service of the advertiser), when the user interacts with the ad, the application communicates 325 instructions to the additional application for displaying 330 the specific page. Hence, when the additional application executes the instructions, the additional application retrieves information from the specific page and presents the retrieved information in the presented state of the additional application. If the presented ad is a listing identifying information about a product for sale, such as a house, via the additional application, the instructions communicated 325 to the additional application include information specifying the product identified by the presented ad, allowing the additional application to retrieve information about the product for presentation 330 via the state of the additional application.

Completing Fields of the Additional Application

If the ad presented 305 to the user includes a deep link to a state of the additional application including fields for the user to provide information, instructions in the deep link may identify information maintained by the application for inclusion in one or more of the fields of the additional application. Communication of information from the application to the additional application is regulated by one or more privacy settings specified by the user, allowing the user to limit distribution of information associated with the user and maintained by the application. Subject to the one or more privacy settings, instructions in the deep link may identify a field of the additional application and information from the application for inclusion in the identified field. Additionally, the instructions may include a command to automatically populate one or more of the fields with information identified by the instructions. For example, if the ad is for subscribing to a service, the state of the additional application associated with the presented 305 ad includes input fields for specifying a first name, a last name, an email address, a phone number, an address, or any other suitable information for subscribing to the service. In this example, the instructions in the deep link include information such as the first name, the last name, and other information maintained by the application as well as a field of the additional application associated with different information maintained by the application. Hence, fields maintained by the additional application are populated with information associated with various fields from the instructions, reducing the information for the user to provide to the fields of the additional application.

Apply Advertisement Content to Additional Application

If the ad presented 305 to the user includes content for use by the additional application, instructions from the deep link communicated 325 to the additional application by the application describe use of the content from the application by the additional application. For example, the ad specifies a coupon or discount code to apply to an object provided by the additional application; hence, the instructions sent to the additional application identify the coupon or discount code and the object to which the coupon or discount code is applied. As an example, if the advertisement describes a coupon for 20% off on sale items for an online shopping application, instructions sent to the online clothing site by the application through a deep link identify the coupon for application to eligible items selected by the user via the online shopping application. In this example, the presented state of the online shopping application identifies items selected by the user with the coupon applied to prices of eligible selected items or other information indicating the coupon was applied.

Action Associated with Advertisement

If the ad includes an input for performing an action via the additional application (e.g., "buy," "purchase," "bid," "book," "vote," "play," or any other suitable prompt for a user to interact with the ad), the instructions communicated to the additional application include information for performing the action. Based on the received instructions, the additional application performs the action based on the instructions. Hence, the presented state of the additional application may indicate that the action was performed or may present information describing subsequent actions based on the executed action.

For example, if the ad includes an input for purchasing a product or service advertised in the ad, instructions communicated 325 to the additional application by the application identify the purchased product or service as well as a confirmation of received or processed payment for the product or service. For example, the user is prompted with a question when interacting with the ad requesting a preference for paying via the application or additional application, and the instructions communicated 325 to the additional application are based on the user's response to the question; thus, the additional application may prompt the user for payment information or receive confirmation of payment from the application. In another embodiment, if the user authorizes the application to communicate payment information to the additional application, the instructions to the additional application identify the product or service as well as encrypted payment information. Payment information may be encrypted using any suitable method, such as a hash of the payment information. Alternatively, based on the instructions from the application, the additional application presents 330 a state in which the user is prompted to provide payment information in one or more fields; as described above, the instructions from the application to the additional application may automatically populate one or more fields with information from the application.

If the ad includes an input for voting in a survey, instructions communicated 325 to the additional application include the user's vote and application of the user's vote to survey results presented 330 in the state of the additional application. In this example, the presented state of the additional application describes the survey results including the user's vote received via interaction with the ad.

In another example, the ad includes an input for playing a file in an additional application, so the instructions communicated 325 to the additional application identify the file and include command to play the file. One or more of the instructions may also specify information describing the file or a representation of the file to be presented by the additional application. For example, if the file is a song, then the representation of the file may be a name of the song, a title of the song, a cover of an album associated with the song, additional songs by the artist of the song, or any other suitable information associated with the song. In this example, the presented 330 state of the additional application is the displayed representation of the file as well as the presentation of the file via the additional application.

In another example, if the ad includes an input for generating a search query for searching for content presented by the ad, instructions communicated 325 to the additional application include a search query based on the content presented by the ad. The instructions may also include information about the content presented by the ad for use with the search query. For example, if the ad presents an event such as an opening of a new restaurant, instructions in a deep link included in the ad may include a command to search for open reservations for the new restaurant within a user-specified time interval. As another example, if the ad presents an event such as a new movie playing at a local theater, instructions in a deep link included in the ad include a command to search for movie times for the new movie at a theater within a threshold distance of the client device 110 within a user-specified time interval. In another example, the ad specifies a travel destination, so instructions in the deep link included in the ad include a command to search for hotels, restaurants, or any other landmarks within a threshold distance of the travel destination. For these examples, the corresponding search results are the presented state of the additional application.

Action Associated with Input

An application may associate one or more inputs (or other content items) with deep links, allowing interaction with an input associated with a deep link to perform an action via an additional application identified by the deep link. For example, an input presented by the application is associated with a deep link identifying the additional application and instructions for performing an action associated with the input via the additional application. When the additional application executes the instructions in the deep link, a state of the additional application indicating the action was performed, presenting information from application of the action, or presenting information describing subsequent actions based on the executed action is presented.

For example, the application presents an input for using an additional application to view or play a file identified by the application and associates a deep link with the input identifying the additional application and including instructions that cause the additional application to retrieve and play or present the file when executed by the additional application. One or more of the instructions may also specify information describing the file or a representation of the file to be presented by the additional application. For example, if the file is a song, then the representation of the file may be a name of the song, a title of the song, a cover of an album associated with the song, additional songs by the artist of the song, or any other suitable information associated with the song. In this example, the presented state of the additional application displays the representation of the song while the song is played or otherwise presented.

In another example, an application includes an input for generating a search query based on content in the application and communicating the search query to an additional application, which presents 330 a state including search results based on the search query. The input is associated with a deep link identifying the additional application and including instructions describing a search query and, optionally, one or more search parameters. For example, if the application presents content identifying a business, an input associated with the content is associated with a deep link identifying a mapping application and instructions for a search query based on information about the business (e.g., an address). In this example, a map identifying the physical location of the business is presented as the state of the mapping application. Similarly, an input in an application associated with content identifying a restaurant or a movie is associated with a deep link identifying an additional application and instructions for the additional application to search for reservations for the restaurant or for show times for the movie. The instructions in the preceding example may also specify search parameters for the additional application, such as a geographic location and threshold distance to the restaurant or to a theater from the geographic location or a time interval in which to search. In another example, an application identifies a travel destination, so instructions in a deep link associated with the travel destination include a command for an additional application to search for hotels, restaurants, or any other landmarks within a threshold distance of the travel destination. As another example, a deep link is associated with an input corresponding to data presented by the application, where the deep link identifies an additional application and instructions identifying a search query for the additional application to compare to data from one or more sources to identify search results. For these examples, the corresponding search results are the presented state of the additional application. Hence, associating a deep link with an input or content presented by an application allows the application to leverage capabilities of one or more applications, improving user interaction with the application.

Communicating States Between Applications

Figure 4:
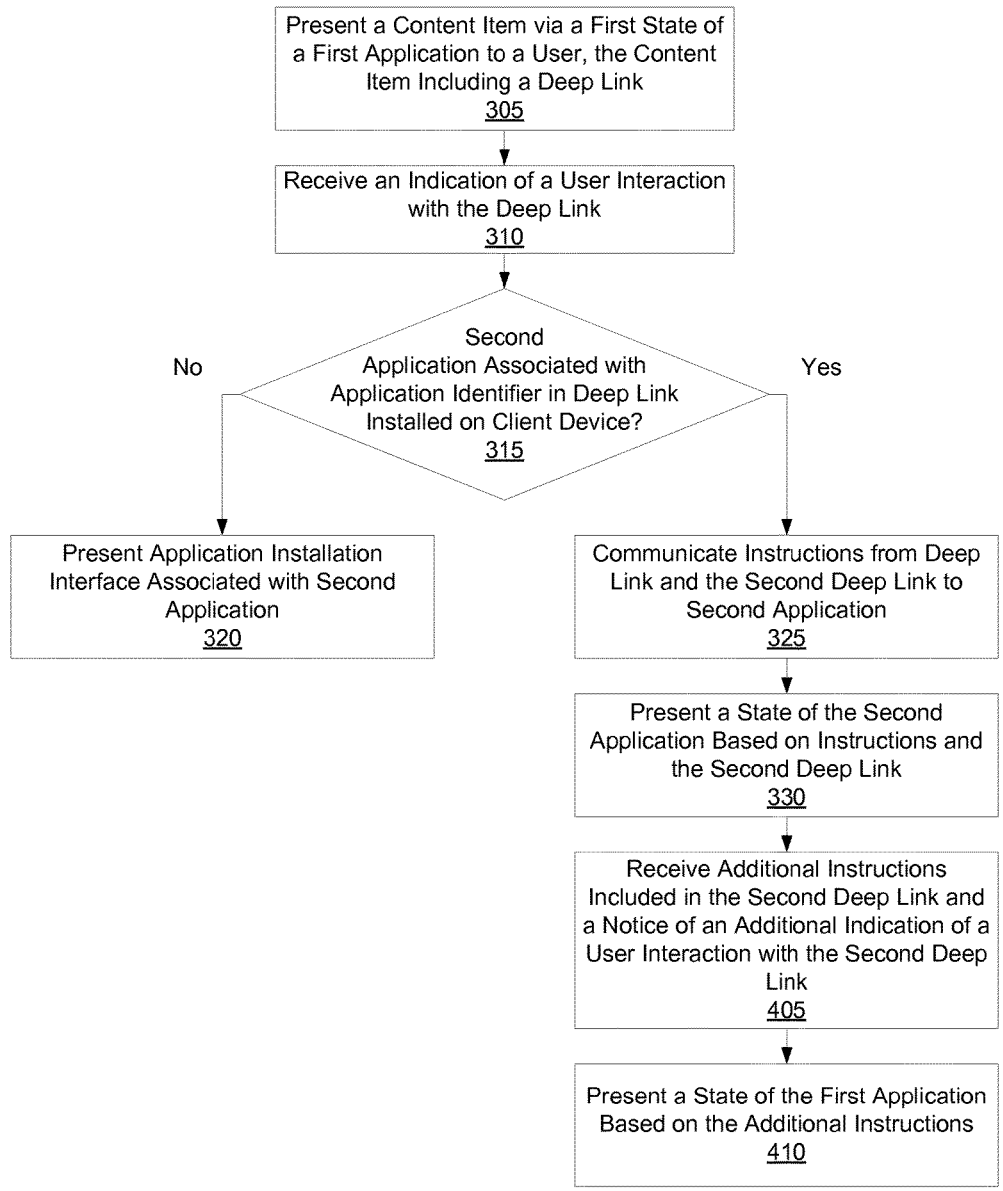
FIG. 4 is a flowchart of a method for communicating a state of an application to an additional application identified by the application and presenting a deep link associated with the state of the application to a user of the online system, in accordance with an embodiment.

FIG. 4 is a flowchart of one embodiment of a method for communicating a state of an application to an additional application identified by the application and presenting a deep link associated with the state of the application to a user of the online system 140. In various embodiments, the steps described in conjunction with FIG. 4 may be performed in different orders. Additionally, in some embodiments, the method may include different and/or additional steps than those shown in FIG. 4. The functionality described in conjunction with FIG. 4 may be provided by an application interface module 115 of a client device 110, in one embodiment, the deep link generation module 240, in another embodiment, or may be provided by any other suitable component, or components, in other embodiments.

As described previously in conjunction with FIG. 3, a content item is communicated from the online system 140 to a client device 110 for presentation 305 to the user, for example, via a first state of an application executing on the client device 110 associated with the online system 140. When the user interacts with the presented application via the client device 110, the application executing on the client device 110 that presents 305 the content item receives 310 an indication of the user interaction. After receiving 310 the indication that the user interacted with the content item, the application determines 315 if the additional application identified by the deep link in the content item is installed on the client device 110. If the application determines 315 that the additional application is installed on the client device 110, the one or more instructions from the deep link are communicated 325 from the application presenting 305 the content item to the additional application and, by executing the instructions from the deep link received from the application, the additional application is configured into a state specified by the instructions. Then, the state of the additional application is presented 330 via the client device 110.

The presented state of the additional application may also include a link (e.g., a hyperlink) or a deep link, herein called a reverse deep link, identifying the application from which the instructions were received. In one embodiment, the online system 140 also communicates 325 the reverse deep link to the client device 110 in addition to the content item. For example, the reverse deep link includes one or more instructions and the application presents the content item in a state specified by the one or more instructions in the reverse deep link. In another embodiment, the application executing on the client device 110 presenting 305 the content item generates the reverse deep link including an additional application identifier associated with the application and one or more additional instructions describing the state of the application executing on the client device 110 when the content item was presented 305.

The reverse deep link can also include content describing the state of the application when the content item was presented 305. If the state of the application presented the content item, the content describing the state can describe the content item, describe a user associated with the content item, present an option to return to the application, or any other suitable description of other content presented in the state of the application. If the one or more instructions completed fields in the additional application, the content describing the state of the application can include an option to return to the application or an option to allow the application to communicate further information such as payment information. If the state of the application is a specified level when presenting the content item, the content describing the state of the application can state the specified level, provide an option to return to the specified level, or describe any other information associated with the specified level.

The reverse deep link is communicated 325 from the application presenting 305 the content item to the additional application. In one embodiment, the reverse deep link is displayed as a banner adjacent to an upper or lower boundary of a display device of the client device in which the state of the additional application is presented 330, as previously described in conjunction with FIG. 3. The content included in the reverse deep link can also be presented as well in the state of the additional application. Therefore, the context provides the user information describing the state of the application before the user interacts with the reverse deep link.

When the user interacts with the reverse deep link via the client device 110, an additional indication is received by the client device 110. The user interaction can be a similar user interaction received as described in conjunction with FIG. 3 in step 310. For example, the additional interaction is received by the additional application and communicated to the application associated with the additional application identifier included in the reverse deep link. After receiving the additional indication, one or more additional instructions included in the reverse deep link are communicated by the client device 110 to the application associated with the reverse deep link. Alternatively, the application receives 405 a notice of the additional interaction as well as the one or more additional instructions included in the reverse deep link. As described previously, the application executes the one or more additional instructions and presents 410 a state of the application based on the one or more additional instructions.

In some embodiments, the additional application communicates instructions to the application based on the presented state of the additional application, based on a user request, or any combination thereof. For example, if the presented state of the additional state makes use of information maintained by the application but not included in the instructions communicated 325 to the additional application, the additional application may communicate instructions to the application for the information maintained by the application. The additional application may communicate the instructions upon a request received from the user where the request confirms communication or approves communication of the instructions. For example, if the user purchases a product or service by interacting with the presented state of the additional application, but payment information was not included in the instructions sent to the additional application by the application, the additional application communicates instructions to the application to prompt the user to verify payment information or obtain payment information from the user. In this example, after obtaining payment information, the application may communicate a confirmation of payment to the additional application. In another example, if the user allows transfer of payment information (e.g., encrypted payment information) between the application and the additional application, when the user purchases a product or a service via the presented state of the additional application, the additional application communicates instructions to the application requesting that the application communicate the payment information to the additional application.

As described above, reverse deep links included in various content items may have different instructions. Additionally, reverse deep links may be associated with inputs presented via an additional application to communicate instructions from the additional application to an application, so interacting with an input presented by an additional application configures the state of the application identified by a reverse deep link associated with the input. The reverse deep link can also include context describing the state of the application when the content item was presented 305 as well as other options available to the user if the content item was an ad, as further described below.

Displaying Content Associated with an Advertised Product or Service

If the ad presented 305 to the user via an application identifies a specific page (e.g., a page describing a product or service of the advertiser) and, when the user interacts with the ad, the application communicates 325 instructions to the additional application for displaying 330 the specific page, the application can also generate and communicate 325 a reverse deep link to the additional application. The reverse deep link can include content that describes a state of the application when the ad was presented 305 such as the specific page. Hence, when the additional application presents the retrieved information in the presented state of the additional application, the additional application also presents the reverse deep link, content in the reverse deep link, and any combination thereof.

Completing Fields of the Additional Application

If the ad presented 305 to the user includes a deep link to a state of the additional application including fields for the user to provide information and the instructions in the deep link identify information maintained by the application for inclusion in one or more of the fields of the additional application, the application communicates 325 those instructions and can also generate and communicate 325 a reverse deep link to the additional application. Here, the reverse deep link can include content that describes the state of the application when the ad was presented 305 and can also indicate an option to the user to return to the application 305 without providing information in the fields of the additional application.

Apply Advertisement Content to Additional Application

In the example where the ad presented 305 to the user includes content for use by the additional application, instructions from the deep link communicated 325 to the additional application by the application describe use of the content from the application by the additional application and the application can also generate and communicate 325 a reverse deep link to return to a state of the application when the ad was presented 305. In one example, the content included in the reverse deep link, when presented to the user via the additional application, can specify various options for the user including returning to the state of the application.

Action Associated with Advertisement

If the ad includes an input for performing an action via the additional application (e.g., "buy," "purchase," "bid," "book," "vote," "play," or any other suitable prompt for a user to interact with the ad) and the instructions communicated to the additional application include information for performing the action, the application can also generate and communicate 325 a reverse deep link including content to the additional application where the content describes a state of the application when the ad was presented 305. The content of the reverse deep link presented can describe an option to return to the state, describe an option to undo the action included in the ad, describe an option to communicate additional information (e.g., payment information) from the application to the additional application, describe an option to auto-populate fields of the additional application with the additional information, or any combination thereof.

If the ad includes an input for voting in a survey and the instructions communicated 325 to the additional application include the user's vote and application of the user's vote to survey results presented 330 in the state of the additional application, the reverse deep link can include context describing an option to share the user's action or information associated with the survey in the state of the application.

In another example, if the ad includes an input for playing a file in an additional application and the instructions communicated 325 to the additional application identify the file and include command to play the file, the reverse deep link can include context describing an option to share information associated with the file in the application or a specified state of the application.

In another example, if the ad includes an input for generating a search query for searching for content presented by the ad and the instructions communicated 325 to the additional application include a search query based on the content presented by the ad, the reverse deep link can include context describing an option to share the search results of the search query on the application, context describing the input to the search query, or any combination thereof.

Action Associated with Input

An application may associate one or more inputs (or other content items) with deep links, allowing interaction with an input associated with a deep link to perform an action via an additional application identified by the deep link.

In one example, if the application presents an input for using an additional application to view or play a file identified by the application and associates a deep link with the input identifying the additional application and including instructions that cause the additional application to retrieve and play or present the file when executed by the additional application, a reverse deep link generated and communicated 325 can include context describing the file, the input associated with the file, and any combination thereof.

In another example, if an application includes an input for generating a search query based on content in the application and communicating the search query to an additional application, which presents 330 a state including search results based on the search query, a reverse deep link generated and communicated 325 can include context describing the results of the search query, the input, parameters for the search query, and any combination thereof.

Figure 5:
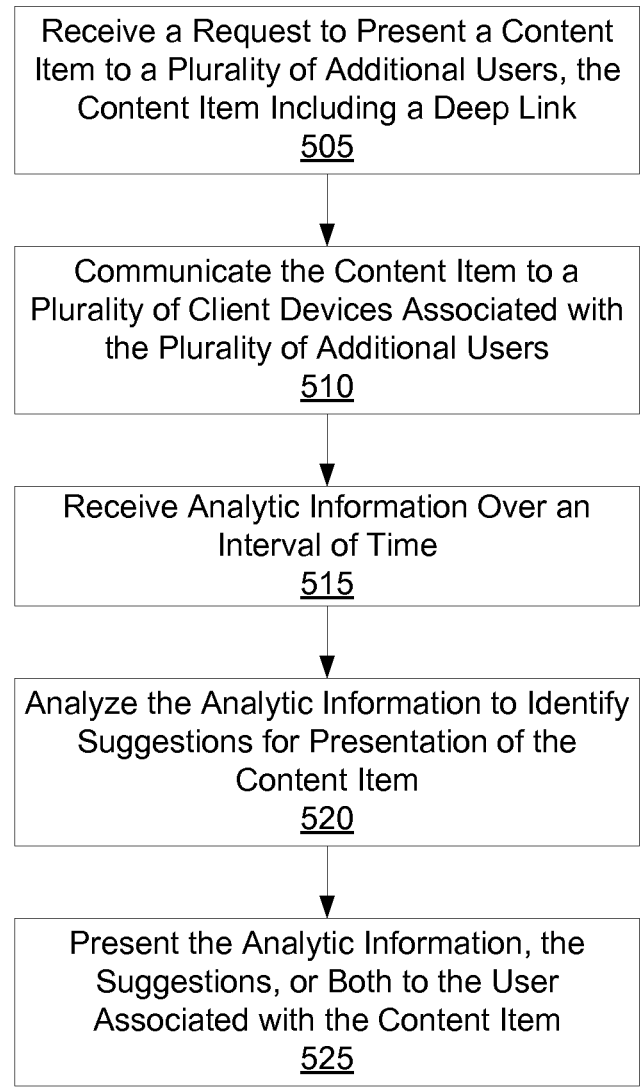
FIG. 5 is a flowchart of a method for tracking analytic information describing user interaction with a deep link presented to a user of an online system on an application associated with the online system, in accordance with an embodiment.

Tracking Analytic Information Between Applications Via Interaction with a Deep Link FIG. 5 is a flowchart of one embodiment of a method for tracking analytic information describing user interaction with a deep link presented to a user of an online system 140 on an application associated with the online system 140. In various embodiments, the steps described in conjunction with FIG. 5 may be performed in different orders. Additionally, in some embodiments, the method may include different and/or additional steps than those shown in FIG. 5. The functionality described in conjunction with FIG. 5 may be provided by an application interface module 115 of a client device 110, in one embodiment, or may be provided by any other suitable component, or components, in other embodiments.

The online system 140 that communicates a content item to a client device 110 for presentation to a user of the online system 140 can also provide analytic information about the performance of the content item on the online system 140 to a user (e.g., an advertiser if the content item is an ad) associated with the content item. The analytic information describes interactions with a deep link or a reverse deep link and/or communications of a deep link or a reverse deep link between applications on client devices 110.

As described previously in conjunction with FIGS. 3 and 4, a content item associated with a user is communicated from the online system 140 to a client device 110 or a plurality of client devices 110 for presentation 305 to an additional user or a plurality of additional users, for example, via an application executing on the client devices 110 associated with the online system 140. The content item can be communicated to the client device for presentation 305 responsive to receiving 505 a request to present the content item to the plurality of additional users of the online system 140. In one embodiment, the request can also include user identifiers (e.g., user names) identifying the plurality of additional users. When the user interacts with the presented application via the client device 110, the application executing on the client device 110 that presents 305 the content item receives 310 an indication of the user interaction. When the indication of the user interaction is received 310 by the client device 110, the client device 110 sends or communicates 505 analytic information describing the user interaction to the online system 140.

Over an interval of time, the online system 140 receives 515 analytic information where the analytic information describes one or more user interactions by one or more of the plurality of additional users with the deep link included in the presented content item. If the presented state of the additional application also includes a reverse deep link that identifies the application from which the instructions were received, the application can send a payload to the additional application including a tracking request. The tracking request is a request to track information associated with the reverse deep link such as information describing user actions on the additional application that are associated with the reverse deep link, content of the content item, and any combination thereof. The information of the tracking request is then communicated from the additional application to the application and the client device 110 sends 510 analytic information describing the user interaction associated with the additional indication received 420 to the online system 140.

Analytic information of a deep link or a reverse deep link included in a content item can describe interaction statistics associated with the deep link, information of applications receiving the deep link or communicating the deep link, user profile information of a user to whom the deep link was presented, general social application usage data associated with a timestamp when the deep link was presented, and any combination thereof. Analytic information describing interaction statistics associated with the deep link include a type of user interaction with the deep link such as a gesture, a contact with a display of the client device presenting the deep link. Interaction statistics can include how many times a deep link was accessed on an application or on a client device 110 as well as what type of client device 110 was used to interact with the deep link.

Analytic information describing applications receiving the deep link for presentation, presenting the deep link, and communicating the deep link include a number of times the deep link was presented on the application, how much time was spent on the application presenting the deep link, and how much time was spent on the additional application associated with an application identifier in the ad including the deep link.

Analytic information describing user profile information of a user to whom the deep link was presented can include information stored in a user profile associated with the user on the online system 140, actions taken by the user in the application presenting the ad or the additional application associated with an application identifier in the ad, and objects associated with those actions.

Analytic information describing general social application usage data associated with a timestamp when the deep link was presented include a timestamp associated with when the application presented the content item including the deep link, and a timestamp associated with when a user interacted with the content item. General social application usage data can also include a number of users using the application or additional application when the content item was presented 305 and information describing pairs of application with at least a threshold ad conversion in an interval of time. For example, the pairs of applications can include an application associated with the online system 140 and a messenger application associated with the online system 140, the application associated with the online system 140 and a third-party application, and a third-party application and another third-party application. The online system 140 stores the analytic information in association with advertiser user associated with the content item, in association with the content item, or both.

The analytic information associated with a content item of advertiser user can be presented 525 to the user via a client device 110 associated with the user. In another embodiment, the online system 140 analyzes 520 the analytic information to identify suggestions for presentation of the content item and presents 525 the analytic information, the suggestions, or any combination thereof to the user associated with the content item. Suggestions and reasons for the suggestions can also be presented 525 to the advertiser based on analysis of or processing of the analytic information. For example, if the content item is an ad and the ad has higher ad conversion when presented at a first time interval rather than a second time interval, the suggestion can be to present the ad at the first time interval. If an ad has higher ad conversion when presented on a first application rather than a second application, the suggestion can be to present the ad on the first application. Similarly, if an ad has a higher ad conversion when presented to a first user rather than a second user, the suggestion can be to present the ad to the first user. The analytic information can also be used by the online system 140 to assist advertisers in ad creation, as further described below in conjunction with FIG. 7.

Communicating Invites Between Applications

Figure 6:
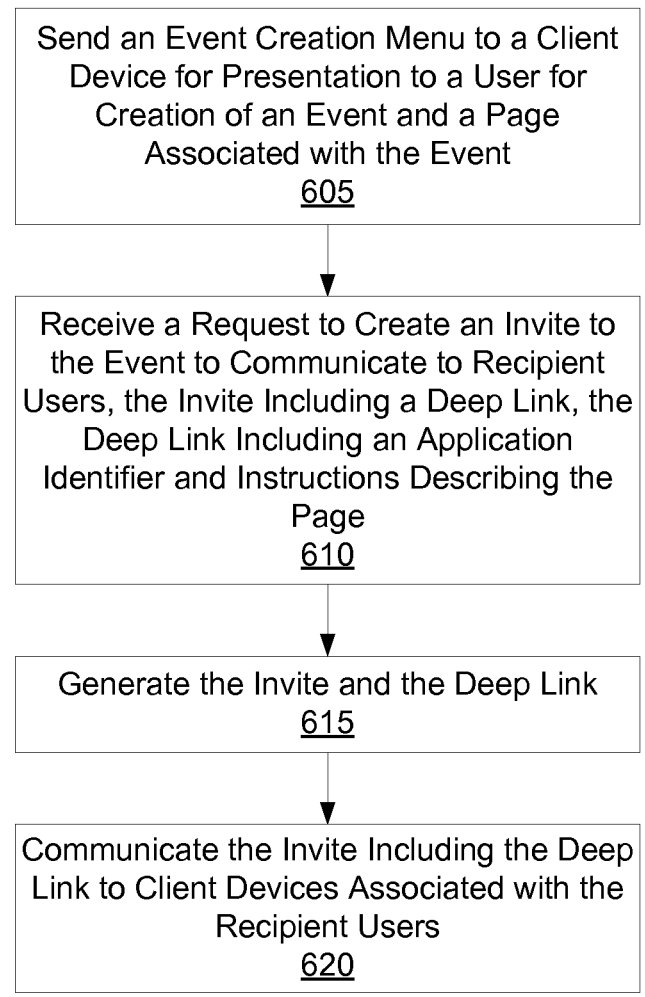
FIG. 6 is a flowchart of a method for communicating an invite to an event via an application to an additional application for presentation to a user of the online system associated with the additional application, in accordance with an embodiment.

FIG. 6 is a flowchart of one embodiment of a method for communicating an invite to an event via an application to an additional application for presentation to a user of the online system 140 associated with the additional application. In various embodiments, the steps described in conjunction with FIG. 6 may be performed in different orders. Additionally, in some embodiments, the method may include different and/or additional steps than those shown in FIG. 6. The functionality described in conjunction with FIG. 6 may be provided by an application interface module 115 of a client device 110, in one embodiment, a deep link generation module 240, in another embodiment, or may be provided by any other suitable component, or components, in other embodiments.

An online system 140 such as the social networking system sends 605 an event creation interface to a client device 110 operated by a user of the online system 140 for creation of an event and the client device 110 presents the event creation interface via an application associated with the online system 140. The event creation interface is configured to enable a user to create an event and to request generation of a deep link to invite recipient users to the event where the other recipient users can be other users of the online system 140 or users of an additional application that is not associated with the online system 140. The event creation interface can also include options to specify details of the event. Event details can include one or more recipient users of the invite, an option to create a page on the online system for the event, a location of the event, a time of the event, or any other suitable addition of information about the event. The details can be entered by selecting options presented in the event creation interface or by a user through fields or an interface in the event creation interface.

The client device 110 receives 610 a request from the user to create an invite for the event. The request from the user can be an interaction with the presented event creation interface or selection of an option in the presented event creation interface. The interaction can be by the user with a portion of a display device of the client device 110 where the event creation interface is presented via a contact with the portion of the display device with a finger or with a stylus. As another example, the interaction can be a gesture from the user with the display device or with another input device that contacts at least a portion of the display device where the event creation interface is presented. Other suitable interactions include an audio command, approaching the portion of the display device presenting the event creation interface with a physical stylus to a threshold distance from a surface of the display device, or any other interaction or gesture indicating interaction with the event creation interface.

Responsive to receiving 610 the request, the client device 110 generates 615 an invite to the event and the invite includes a deep link including one or more instructions describing presentation of details of the event, presentation of a page in the online system 140 associated with the event, presentation of a page in an additional application that is not associated with the online system 140, or any combination thereof. In one embodiment, the deep link includes one or more instructions describing presentation of details of the event to a user via an event tracking application such as a calendar application, an email application, or any other suitable application that can track events for the user. In an alternative embodiment, the client device 110 sends the request to the online system 140 and the online system 140 generates the invite to the event. The generated invite is then sent to the client device 110.

The client device 110 presents the invite to the user via the application associated with the online system. In another embodiment, the user can specify an alternative application associated with the online system 140 or with any other suitable online system to receive the invite and the client device 110 presents the invite to the user via the alternative application.

In addition to receiving 610 the request to create an invite, the client device 110 can also receive 610 a request to send or communicate the invite to one or more client devices associated with the one or more recipient users of the application associated with the online system 140, the alternative application associated with the online system 140 or with any other suitable online system, or any other suitable networking application including a messaging application, a community application, or any other application associated with an online system. Then, the online system 140 sends the invite to the recipient users automatically after the invite to the event is generated 615.

In an alternative embodiment, the online system 140 sends 605 an event creation interface to a client device 110 operated by a user of the online system 140 for presentation on an additional application that is not associated with the online system 140 for creation of an event on the online system 140. Thus, the client device 110 presents the event creation interface via the additional application that is not associated with the online system 140 and the request received 610 is to create an invite to the event and the associated page of an application associated with the online system 140.

Then, the generated 615 invite to the event can be communicated 620 to recipient users associated with the online system 140 via the application associated with the online system 140, via the additional application to recipient users associated with the online system 140, via the additional application to recipient users associated with the additional online system associated with the additional application, or any combination thereof.

If a recipient user interacts with the deep link included in the invite via the application associated with the online system 140, the client device 110 operated by the recipient user presents the page associated with the event on the online system 140 via the application executing on the client device 110. Alternatively, if a recipient user interacts with the deep link included in the invite via the additional application that is not associated with the online system 140, the client device 110 communicates instructions included in the deep link to an application associated with the application identifier (e.g., the application associated with the online system 140 following the previous example) and the page associated with the event on the online system 140 is presented via the application executing on the client device 110. In yet another embodiment, if a recipient user interacts with the deep link included in the invite, an event tracking application can present details of the event and the details can be presented based on instructions included in the deep link to present the details of the event via the event tracking application. As an example, if a recipient user interacts with the deep link included in the invite, an event tracking application such as a calendar application can present details of the event as a calendar entry. Then, the recipient user can include and track the event in their calendar application.

By executing the instructions from the deep link of the invite, the application associated with the online system 140 is configured into a state specified by the instructions in the deep link of the invite. The state of the application from execution of the instructions from the deep link is presented via the client device 110 as previously described in conjunction with FIG. 3. For example, the state of the additional application presented includes the event details and can be the page associated with the event of the invite.

Generating an Ad Based on a Deep Link

Figure 7:
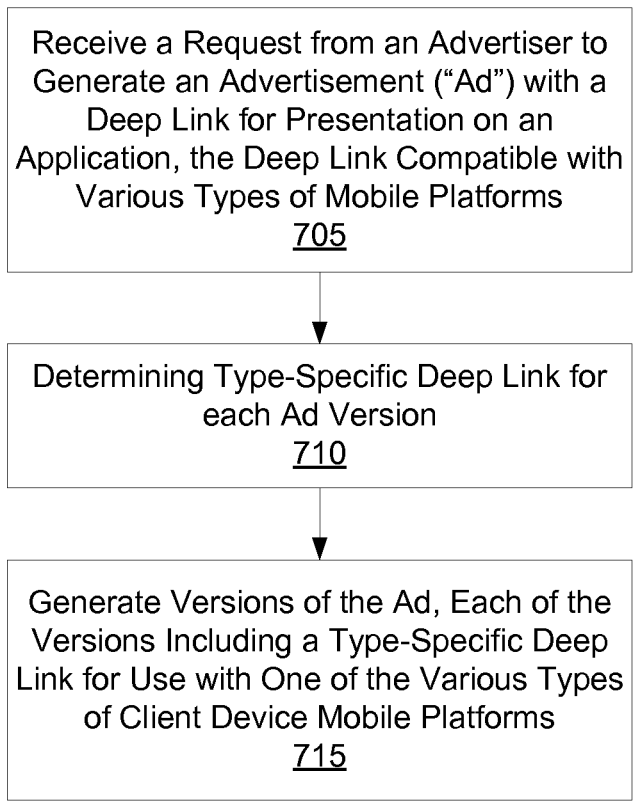
FIG. 7 is a flowchart of a method for generating an ad for an advertiser based on a deep link provided by the advertiser, in accordance with an embodiment.

FIG. 7 is a flowchart of one embodiment of a method for generating an ad for an advertiser based on a deep link provided by the advertiser. In various embodiments, the steps described in conjunction with FIG. 7 may be performed in different orders. Additionally, in some embodiments, the method may include different and/or additional steps than those shown in FIG. 7. The functionality described in conjunction with FIG. 7 may be provided by an application interface module 115 of a client device 110, in one embodiment, a deep link generation module 240, in another embodiment, in one embodiment, or may be provided by any other suitable component, or components, in other embodiments.

The online system 140 receives 705 a request from an advertiser to generate an ad, where the request specifies that the ad include a deep link to a state of a second application of the advertiser (e.g., a link to a product page in the advertiser's app). The request further specifies generation of versions of the ad in which the deep link is compatible with various types of client device mobile platforms. For example, the advertiser may wish to generate an ad that is compatible with mobile devices running ANDROID™, iOS®, etc. and across iPHONES™, iPADS™, etc. The deep link will include different information (e.g., a different address or URL) for each of these different mobile platforms under the custom address scheme described above. Rather than requiring the advertiser to input the different information for each different device type and OS, the online system 140 takes care of this for the advertiser. The advertiser can thus request multi-device compatible ads, and provide the information for the deep link for one mobile platform, including providing an application identifier identifying the second application along with the instructions describing the state of the second application for the deep link. This information can be used to generate an ad for one mobile platform with a deep link, as previously described in conjunction with FIGS. 3-6. However, the online system 140 can also generate versions of the ad for other mobile platforms.

In some embodiments, the request from the advertiser can also include various other details about the ad that are normally provided when creating an ad, such as the ad creative content and targeting criteria. Targeting criteria can include one or more characteristics of users eligible to be presented with the generated ad, as described in conjunction with FIG. 2.

Based on the request from the advertiser, the online system 140 determines 710 information corresponding to type-specific deep links for each of the versions of the ad that the advertiser is requesting. For example, the online system 140 can auto populate various fields in an ad creation user interface that may have been presented to the advertiser for creation of the ad. The advertiser can enter the content for creation of the deep link for one type of mobile platform (e.g., for ANDROID™), and the online system 140 can auto populate fields for creation of versions of the ad with other type-specific deep links (e.g., for iOS®, iPHONE™ iPAD™).

The online system 140 then generates 715 the versions of the ad, each version comprising one of the determined type-specific deep links for use with one of the various types of client device mobile platforms. The type-specific deep link is a deep link that is associated with a client device mobile platform based on the specific tags associated with information in the deep link. As previously described in FIG. 2, based on information describing a client device (e.g., type of client device 110, operating system used by the client device 110), specific tags are associated with the information included in the deep link. Therefore, the type-specific deep link associated with a first client device 110 such as a client device 110 using a first operating system is a deep link with tags specific to the first operating system. Thus, if a second client device 110 uses a second operating system, the online system 140 can generate two ad versions, one for presentation on the first operating system and one for presentation on the second operating system.

If a first client device 110 is associated with a user associated with a first characteristic and a second characteristic where the first and second characteristics are included in the targeting criteria and a second client device 110 is associated with another user associated with the first characteristic and a third characteristic where the third characteristic is not included in the targeting criteria, the online system 140 can generate two ads for presentation to the user and the another user. The online system 140 can present the one or more ads to the advertiser who can then select a set of the one or more ads for presentation to one or more users of the online system 140.

Alternatively, the online system 140 can also determine targeting criteria for the generated ad if the targeting criteria were not previously provided by the advertiser. The targeting criteria can be determined based on analytic information associated with other ads of the advertiser previously presented on the online system 140, with ad content in the generated ad, or any combination thereof. For example, if the analytic information included interaction statistics indicating ads including deep links associated with the advertiser are accessed more frequently by users with client devices using a first operating system than by users with client devices using a second operating system, the targeting criteria can be determined to include users associated with client devices using the first operating system. The targeting criteria can also be determined to include users associated with objects associated with users that have accessed deep links of the advertiser with at least a threshold frequency in an interval of time. If deep links of the advertiser have been associated with timestamps in an interval of time in a day based on the analytic information, targeting criteria for the deep link can be determined to include presenting the generated ad at the interval of time in a day.

The online system 140 identifies users of the online system 140 to present the generated ad based on the targeting criteria and sends the generated ad to client devices 110 associated with the identified users for presentation of the generated ad to the identified user via an application associated with the online system 140 executing on the client device 110. If the generated ad includes a deep link, the online system 140 can receive analytic information describing user interactions with the deep link. Then, the analytic information associated with the deep link in the generated ad can be presented to the advertiser via a client device 110 associated with the advertiser, as previously described in conjunction with FIG. 5.

Figure 8A:
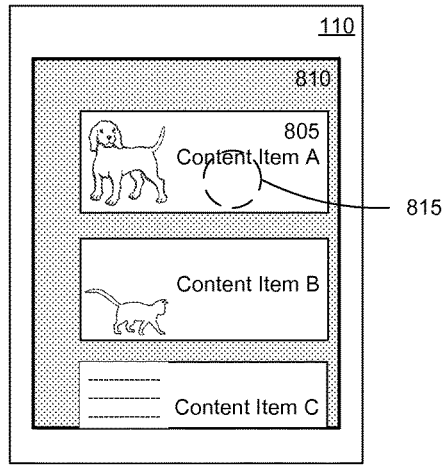
FIGS. 8A-8D illustrate states of applications being linked to or from via a deep link, in accordance with an embodiment.

Deep Linking Between a State of an Application to a State of an Additional Application FIGS. 8A-8D illustrate states of applications being linked to or from via a deep link. As shown in FIG. 8A, a content item 805 such as an advertisement is presented on an application 810 executing on a client device 110 for presentation to a user associated with the client device 110. As previously described, the content item includes a deep link to an additional application on the client device. The deep link includes an application identifier identifying the additional application and includes one or more instructions that when executed by the additional application present a state of the additional application. The state can be a page on the additional application, a content item of the additional application, or any other suitable content that can be displayed. If the content item is an advertisement, the advertisement is associated with an advertiser and targeting criteria and includes ad content in addition to the deep link.

Figure 8B:
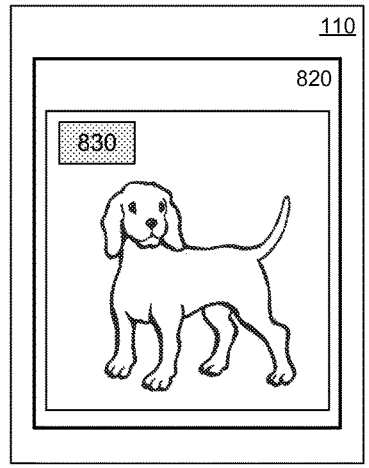
Figure 8C:
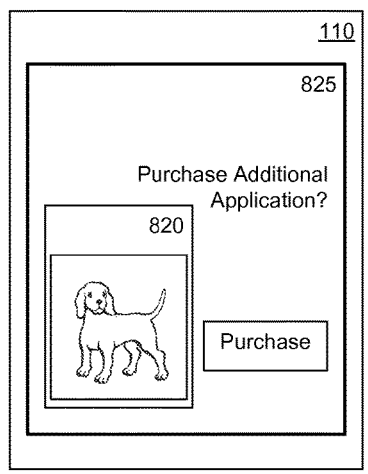

The client device 110 receives an indication of a user interaction 815 with the deep link in the presented content item 805 and determines whether the additional application 820 associated with the application identifier is installed on the client device 110. Responsive to determining the additional application 820 is installed on the client device 110, the one or more instructions from the deep link are communicated to the additional application 820 and the additional application 820 executes the one or more instructions to present a state of the additional application 820, as shown in FIG. 8B. Responsive to determining the additional application 820 is not installed on the client device, an application installation interface 825 is presented to the user for downloading, purchasing, or installing the additional application, as shown in FIG. 8C.

Figure 8D:
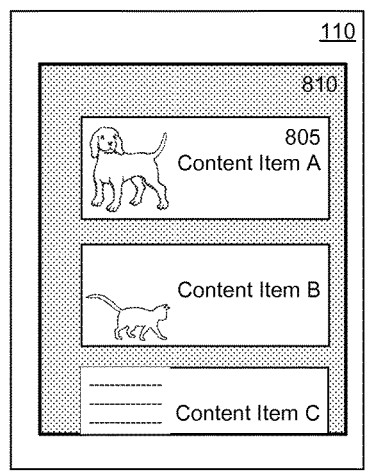

The client device 110 can also communicate a second deep link 830 allowing navigation back to a state of the application 810 when the content item 805 was presented, as shown in FIG. 8B. The second deep link 830 also includes an application identifier identifying the application 810 and instructions describing the state of the application 810 when the content item 805 was presented in FIG. 8A. User interaction with the second deep link 830 communicates the instructions in the second deep link to the application 810 and presents the state of the application 810 when the content item 805 was presented, as shown in FIG. 8D.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
presenting a first state of a first mobile application on a client device of a user, the first state comprising a content item comprising a first deep link, the first deep link comprising a first application identifier identifying a second mobile application and a first plurality of instructions that, when executed by the second mobile application, present a state of the second mobile application;
receiving a user interaction with the first deep link included in the presented content item;

determining if the second mobile application associated with the first application identifier is installed on the client device;

responsive to determining that the second mobile application is installed on the client device, transmitting the first plurality of instructions and a second deep link to the second mobile application, the second deep link comprising a second application identifier identifying the first mobile application and a second plurality of instructions that, when executed by the first mobile application, present the first state of the first mobile application; and responsive to receiving a communication from the second mobile application indicating that the user has interacted with the second deep link, presenting the first state of the first mobile application to the user via the client device, the communication comprising the second plurality of instructions.

2. The method of claim 1, wherein the first deep link further comprises metadata describing additional information for communication to the second mobile application identified by the first application identifier of the first deep link, the additional information selected from a group consisting of: a web address associated with the state of the second mobile application, information describing the first mobile application, information identifying authentication of access to the user's information in the first mobile application, and any combination thereof.

3. The method of claim 1, wherein the client device is associated with a type and one or more tags are associated with the first application identifier based on the type.

4. The method of claim 1, wherein the client device is associated with an operating system and one or more tags are associated with the first application identifier based on the operating system.

5. The method of claim 1, wherein the content item is an advertisement and includes an offer for the user and the first plurality of instructions configure the second mobile application to apply the offer to a product associated with the content item in the second mobile application.

6. The method of claim 1, wherein the content item is an advertisement and is associated with an action to be performed by the user and the first plurality of instructions communicate information to the second mobile application for performing the action.

7. The method of claim 6, wherein the action is selected from a group consisting of: purchasing a product associated with the content item, performing a search on the state of the second mobile application, selecting an option on the state of the second mobile application, populating fields on the state of the second mobile application, and any combination thereof.

8. The method of claim 1, further comprising:
responsive to determining the second mobile application is not installed on the client device, presenting an application installation interface for purchasing, downloading, or installing the second mobile application.

9. The method of claim 1, further comprising:
responsive to receiving the user interaction with the presented content item, communicating analytic information describing the user interaction to an online system associated with the first mobile application.

10. The method of claim 1, further comprising:
communicating context describing the first state of the first mobile application.

11. The method of claim 1, further comprising:
receiving permission for communicating payment information to the second mobile application; and
communicating payment information to the second mobile application.

12. The method of claim 1, further comprising:
communicating a tracking request to the second mobile application, the tracking request requesting analytic information describing user interaction with the second deep link on the second mobile application.

13. A computer program product comprising a non-transitory computer-readable storage medium having instructions encoded thereon that, when executed by a processor, cause the processor to:

present a first state of a first mobile application on a client device of a user, the first state comprising a content item comprising a first deep link, the first deep link comprising a first application identifier identifying a second mobile application and a first plurality of instructions that, when executed by the second mobile application, present a state of the second mobile application;

receive a user interaction with the first deep link included in the presented content item;

determine if the second mobile application associated with the first application identifier is installed on the client device;

responsive to determining that the second mobile application is installed on the client device, transmit the first plurality of instructions and a second deep link to the second mobile application, the second deep link comprising a second application identifier identifying the first mobile application and a second plurality of instructions that, when executed by the first mobile application, present the first state of the first mobile application; and responsive to receiving a communication from the second mobile application indicating that the user has interacted with the second deep link, present the first state of the first mobile application to the user via the client device, the communication comprising the second plurality of instructions.

14. The computer program product of claim 13, wherein the first deep link further comprises metadata describing additional information for communication to the second mobile application identified by the first application identifier of the first deep link, the additional information selected from a group consisting of: a web address associated with the state of the second mobile application, information describing the first mobile application, information identifying authentication of access to the user's information in the first mobile application, and any combination thereof.

15. The computer program product of claim 13, wherein the client device is associated with a type and an operating system and one or more tags are associated with the first application identifier based on the type and the operating system.

16. The computer program product of claim 13, wherein the instructions, when executed by the processor, further cause the processor to:
responsive to determining the second mobile application is not installed on the client device, present an application installation interface for purchasing, downloading, or installing the second mobile application.

17. The computer program product of claim 13, wherein the instructions, when executed by the processor, further cause the processor to:

responsive to receiving the user interaction with the presented content item, communicate analytic information describing the user interaction to an online system associated with the first mobile application.

18. The computer program product of claim 13, wherein the instructions, when executed by the processor, further cause the processor to:
communicate context describing the first state of the first mobile application.

* * * * *